(12) United States Patent
Arsenault

(10) Patent No.: US 9,599,515 B2
(45) Date of Patent: Mar. 21, 2017

(54) TEMPERATURE-RESPONSIVE PHOTONIC CRYSTAL DEVICE

(75) Inventor: Andre Arsenault, Toronto (CA)

(73) Assignee: OPALUX INCORPORATED, Toronto, CA (US)

( * ) Notice: Subject to any disclaimer, the term of this patent is extended or adjusted under 35 U.S.C. 154(b) by 80 days.

(21) Appl. No.: 13/203,419

(22) PCT Filed: Feb. 25, 2010

(86) PCT No.: PCT/CA2010/000293
§ 371 (c)(1),
(2), (4) Date: Nov. 7, 2011

(87) PCT Pub. No.: WO2010/096936
PCT Pub. Date: Sep. 2, 2010

(65) Prior Publication Data
US 2012/0044970 A1     Feb. 23, 2012

Related U.S. Application Data

(60) Provisional application No. 61/155,189, filed on Feb. 25, 2009.

(51) Int. Cl.
G01K 11/06 (2006.01)
G01K 3/04 (2006.01)
G01K 11/12 (2006.01)

(52) U.S. Cl.
CPC .............. *G01K 3/04* (2013.01); *G01K 11/125* (2013.01)

(58) Field of Classification Search
CPC combination set(s) only.
See application file for complete search history.

(56) References Cited

U.S. PATENT DOCUMENTS

| | | | |
|---|---|---|---|
| 4,302,971 A * | 12/1981 | Luk ............................... | 374/162 |
| 5,124,819 A * | 6/1992 | Davis ............................ | 349/199 |
| 5,153,066 A * | 10/1992 | Tanaka et al. ................ | 428/373 |
| 6,261,469 B1 * | 7/2001 | Zakhidov ............... | B82Y 20/00 |
| | | | 216/56 |
| 6,338,292 B1 * | 1/2002 | Reynolds et al. ........... | 89/36.02 |
| 6,382,125 B1 * | 5/2002 | Tamura ........................ | 116/207 |
| 6,956,689 B2 * | 10/2005 | Takiguchi et al. ........... | 359/290 |

(Continued)

FOREIGN PATENT DOCUMENTS

| | | |
|---|---|---|
| EP | 1549995 B1 | 7/2005 |
| WO | WO 02/44728 | 6/2002 |

(Continued)

OTHER PUBLICATIONS

Arsenault et al., "From colour fingerprinting to the control of photoluminescence in elastic photonic crystals", Nature MMaterials, vol. 5, Feb. 19, 2006, pp. 179-184.*

(Continued)

*Primary Examiner* — Lisa Caputo
*Assistant Examiner* — Nasir U Ahmed
(74) *Attorney, Agent, or Firm* — Norton Rose Fulbright US LLP

(57) ABSTRACT

A temperature-responsive photonic crystal device comprising having a temperature-responsive photonic crystal material, whereby exposure of the device to a temperature above a predetermined threshold temperature is indicated by a detectable change in the device.

27 Claims, 8 Drawing Sheets

(56) References Cited

U.S. PATENT DOCUMENTS

| | | | |
|---|---|---|---|
| 7,119,859 B2* | 10/2006 | Chari et al. | 349/88 |
| 7,364,673 B2* | 4/2008 | Arsenault et al. | 252/586 |
| 7,616,376 B2* | 11/2009 | Arsenault et al. | 359/321 |
| 8,313,951 B2* | 11/2012 | Blais et al. | 436/147 |
| 8,345,215 B2* | 1/2013 | Renneberg | 374/159 |
| 2003/0148088 A1* | 8/2003 | Padmanabhan | B82Y 20/00 428/304.4 |
| 2004/0131799 A1* | 7/2004 | Arsenault et al. | 428/1.26 |
| 2004/0158156 A1* | 8/2004 | Schneemeyer et al. | 600/474 |
| 2004/0264903 A1* | 12/2004 | Dridi | B82Y 20/00 385/129 |
| 2008/0227349 A1* | 9/2008 | Eyck et al. | 442/60 |
| 2008/0253411 A1 | 10/2008 | McPhail et al. | 372/26 |
| 2008/0279253 A1* | 11/2008 | MacDonald et al. | 374/162 |
| 2009/0087635 A1 | 6/2009 | Nakamura et al. | |
| 2010/0150511 A1* | 6/2010 | Arsenault et al. | 385/130 |

FOREIGN PATENT DOCUMENTS

| | | | |
|---|---|---|---|
| WO | WO 2008/098339 | 8/2008 | |
| WO | WO 2008/098339 A1 | 8/2008 | |
| WO | WO 2008098339 A1 * | 8/2008 | G02B 6/122 |
| WO | WO 2009/087635 A1 | 7/2009 | |

OTHER PUBLICATIONS

Valkama et al., "Self-assembled polymeric solid films with temperature-induced large and reversible photonic-bandgap switching", Nature Materials, vol. 3, Dec. 2004, pp. 872-876.*

Arsenault et al., "From colour fingerprinting to the control of photoluminescence in elastic photonic crystals", nature materials, vol. 5, Mar. 2006, pp. 179-184.*

International Search Report and Written Opinion for International Application No. PCT/CA2010/000293, filed Feb. 25, 2010.

Chen et al., "Preparation and thermos-responsive light diffraction behaviors of soft polymerized crystalline colloidal arrays," *Soft Matter*, 3:571-579, 2007.

Garner et al., "Tunable Photonic Crystals Incorporating Variable Refractive Index Organic Polymers," *8th IEEE Conference on Nanotechnology*, 108-109, 2008.

* cited by examiner

| Repeating Unit | $T_g$ (°C) | $T_m$ (°C) | Repeating Unit | $T_g$ (°C) | $T_m$ (°C) |
|---|---|---|---|---|---|
| Acenaphthylene | 214 | | N,N-Dimethylacrylamide | 89 | |
| Acetaldehyde | -32 | 165 | Dimethylaminoethyl methacrylate | 19 | |
| 4-Acetoxystyrene | 116 | | 2,6-Dimethyl-1,4-phenylene oxide | 167 | |
| Acrylamide | 165 | | Dimethylsiloxane | -127 | -40 |
| Acrylic acid | 105 | | 2,4-Dimethylstyrene | 112 | |
| Acrylonitrile, syndiotactic | 125 | 319 | 2,5-Dimethylstyrene | 143 | |
| Allyl glycidyl ether | -78 | | 3,5-Dimethylstyrene | 104 | |
| Benzyl acrylate | 6 | | Dodecyl acrylate | -3 | |
| Benzyl methacrylate | 54 | | Dodecyl methacrylate | -65 | |
| Bisphenol A-alt-epichlorohydrin | 100 | | Dodecyl vinyl ether | -62 | |
| Bisphenol A terephthalate | 205 | | Epibromohydrin | -14 | |
| Bisphenol carbonate | 174 | | Epichlorohydrin | -22 | |
| Bisphenol F carbonate | 147 | | 1,2-Epoxybutane | -70 | |
| Bisphenol Z carbonate | 175 | | 1,2-Epoxydecane | -70 | |
| 4-Bromostyrene | 118 | | 1,2-Epoxyoctane | -67 | |
| cis-Butadiene | 102 | 1 | 2-Ethoxyethyl acrylate | -50 | |
| trans-Butadiene | -58 | 148 | 4-Ethoxystyrene | 86 | |
| 1-Butene | -24 | 171 | Ethyl acrylate | -24 | |
| N-tert-Butylacrylamide | 128 | | Ethyl cellulose | 43 | |
| Butyl acrylate | -54 | | Ethylene, HDPE | -125 | 130 |
| sec-Butyl acrylate | -26 | | Ethylene adipate | -46 | 54 |
| tert-Butyl acrylate | 43-107 | 193 | Ethylene-trans-1,4-cyclohexyldicarboxylate | 18 | – |
| 2-tert-Butylaminoethyl methacrylate | 33 | | Ethylene isophthatate | 51 | |
| Butyl glydicyl ether | -79 | | Ethylene malonate | -29 | |
| Butyl methacrylate | 20 | | Ethylene 2,6-napthalenedicarboxylate | 113 | |
| tert-Butyl methacrylate | 118 | | Ethylene oxide | -66 | 66 |
| 4-tert-Butylstyrene | 127 | | Ethylene terephthalate | 72 | 265 |
| tert-Butyl vinyl ether | 88 | 250 | 2-Ethylhexyl acrylate | -50 | |
| Butyl vinyl ether | -55 | 64 | 2-Ethylhexyl methacrylate | -10 | |
| ε-Caprolactone | -60 | | 2-Ethylhexyl vinyl ether | -66 | |
| Cellulose nitrate | 53 | | Ethyl methacrylate | 65 | |
| Cellulose tripropionate | | | Ethyl vinyl ether | -43 | 86 |
| cis-Chlorobutadiene | -20 | 80 | 4-Fluorostyrene | 95 | |
| trans-Chlorobutadiene | -40 | 101 | Formaldehyde | -82 | 181 |
| 2-Chlorostyrene | 119 | | Hexadecyl acrylate | 35 | |
| 3-Chlorostyrene | 90 | | Hexadecyl methacrylate | 15 | |
| 4-Chlorostyrene | 110 | | Hexyl acrylate | 57 | |
| Chlorotrifluoroethylene | 52 | 214 | Hexyl methacrylate | -5 | |
| 2-Cyanoethyl acrylate | 4 | | 2-Hydropropyl methacrylate | 76 | |
| Cyclohexyl acrylate | 19 | | Hydroquinone-alt-epichlorohydrin | 60 | |
| Cyclohexyl methacrylate | 92 | | 2-Hydroxyethyl methacrylate | 57 | |
| Cyclohexyl vinyl ether | 81 | | Indene | 85 | |
| 2,6-Dichlorostyrene | 167 | | Isobornyl acrylate | 94 | |
| Diethylaminoethyl methacrylate | 20 | | Isobornyl methacrylate | 110 | |

FIG. 8

| Repeating Unit | $T_g$ (°C) | $T_m$ (°C) | Repeating Unit | $T_g$ (°C) | $T_m$ (°C) |
|---|---|---|---|---|---|
| Isobutyl acrylate | -24 | | p-Phenylene terephthalamide | 345 | |
| Isobutylene | -73 | | Phenylene vinylene | 80 | 380 |
| Isobutyl methacrylate | 53 | | Phenyl methacrylate | 110 | |
| Isobutyl vinyl ether | -19 | 165 | Phenyl vinyl ketone | 74 | |
| cis-Isoprene | -63 | 28 | Potassium acrylate | 194 | |
| trans-Isoprene | -66 | 65 | Propylene, atactic | -13 | |
| N-Isopropylacrylamide | 85-130 | | Propylene, isotactic | -8 | 176 |
| Isopropyl acrylate, isotactic | -11 | 162 | Propylene, syndiotactic | -8 | |
| Isopropyl methacrylate | 81 | | Propylene oxide | -75 | 66 |
| Methacrylic acid | 228 | | Propyl vinyl ether | -49 | 76 |
| Methacrylic anhydride | 159 | | Sodium acrylate | 230 | |
| Methacrylonitrile | 120 | | Sodium methacrylate | 310 | |
| 2-Methoxyethyl acrylate | -50 | | Styrene, atactic | 100 | |
| 4-Methoxystyrene | 113 | | Styrene, isotactic | 100 | 240 |
| Methyl acrylate | 10 | | Tetrabromobisphenol A carbonate | 157 | |
| Methyl cellulose | | | Tetrafluoroethylene | 117 | 327 |
| Methyl glycidyl ether | -62 | | Tetrahydrofuran | -84 | |
| Methyl methacrylate, atactic | 105,120 | | Tetramethylene adipate | -118 | |
| Methyl methacrylate, syndiotactic | 115 | 200 | Tetramethylene terephthalate | 17 | 232 |
| 4-Methylpentene | 29 | 250 | Thio-1,4-phenylene | 97 | 285 |
| Methylphenylsiloxane | -86 | | 2,2,2-Trifluoroethyl acrylate | -10 | |
| Methylstyrene | 20 | | Trimethylene oxide | -78 | |
| 3-Methylstyrene | 97 | | Trimethylsilyl methacrylate | 68 | |
| 4-Methylstyrene | 97 | | 2,4,6-Trimethylstyrene | 162 | |
| Methyl vinyl ether | -31 | 144 | Vinyl acetal | 355 | 82 |
| Nylon 4,6 (tetramethylene adipamide) | 43 | | Vinyl acetate | 30 | |
| Nylon 6 (-caprolactam) | 52 | 225 | Vinyl alcohol | 85 | 220 |
| Nylon 6,6 (hexamethylene adipamide) | 50 | 265 | Vinyl benzoate | 71 | |
| Nylon 6,9 (hexamethylene azelamide) | 58 | | Vinyl 4-tert-butylbenzoate | 101 | – |
| Nylon 6,10 (hexamethylene sebacamide) | 50 | 227 | Vinyl butyral | 322 | 49 |
| Nylon 6,12 (hexamethylene dodecane-diamide) | 46 | | Vinyl carbazole | 227 | 320 |
| | | | Vinyl chloride | 81 | 227 |
| Nylon 11 (ω-undecanamide) | 42 | 189 | Vinyl cyclohexanoate | 76 | |
| Nylon 12 (ω-dodecanamide) | 41 | 179 | Vinylferrocene | 189 | |
| 1-Octadecene | 55 | | Vinyl fluoride | 41 | 200 |
| Octadecyl methacrylate | -100 | | Vinyl formal | 105 | |
| 1-Octene | -63 | | Vinylidene chloride | -18 | 200 |
| Octyl methacrylate | -20 | | Vinylidene fluoride | -40 | 171 |
| Oxy-4,4'-biphenyleneoxy-1,4-phenylenesulfonyl-1,4-phenylene | 230 | 290 | 2-Vinyl naphthalene | 151 | |
| | | | Vinyl pivalate | 86 | |
| Oxy-1,4-phenylenesulfonyl-1,4-phenyleneoxy-1,4-phenyleneisopropylidene-1,4-phenylene | 165 | 190 | Vinyl propionate | 10 | |
| | | | 2-Vinylpyridine | 104 | |
| Oxy-1,4-phenylenesulfonyl-1,4-phenylene ether | 214 | 230 | 4-Vinylpyridine | 142 | |
| | | | 1-Vinyl-2-pyrrolidone | 54 | |
| p-Phenylene isophthalamide | 225 | 380 | Vinyl trifluoroacetate | 46 | |

FIG. 9

TEMPERATURE-RESPONSIVE PHOTONIC CRYSTAL DEVICE

CROSS REFERENCE TO RELATED APPLICATIONS

This patent application claims priority to International Application No. PCT/CA2010/000293, filed Feb. 25, 2010, which claims the benefit of U.S. Provisional Application No. 61/155,189, filed Feb. 25, 2009, both of which are herein incorporated by reference in their entireties.

TECHNICAL FIELD

The present disclosure relates to a temperature-responsive photonic crystal device. In particular, the present disclosure relates to a temperature-responsive photonic crystal device that may be used as a temperature indicator for a temperature sensitive article or product.

BACKGROUND

Photonic crystals (PCs) are materials having a periodic modulation in their refractive index (Yablonovitch, Phys. Rev. Lett., 58:2059, 1987), giving rise to a photonic band gap or stop gap, in which electromagnetic waves within a certain stop band wavelength range are totally reflected. The wavelengths of the stop band are dependent on the distance between the periodic modulations in the crystal. The reflected stop band wavelengths appear in the reflectance spectrum as a distinct reflectance peak known as a Bragg peak. The crystal may have a one-, two-, or three-dimensional periodic structure.

Because of the sensitivity of a PC, slight changes in the refractive index or lattice spacing results in detectable changes in the reflected light. This may be particularly useful where the reflected light is in the visible range, allowing for changes in color if the refractive index or lattice spacing is modulated. By incorporating polymers into PC materials, these materials may be made responsive to external stimuli, such as mechanical forces. An example of such an application is described by Arsenault et al. in PCT Patent Application No. 2008/098339, which is herein incorporated by reference in its entirety.

Perishable products such as foodstuffs, alcoholic beverages, pharmaceuticals, cosmetics, biological materials, chemical substances, live tissue samples, photographic materials and vaccines typically require storage with certain temperature ranges if stored for certain lengths of time. They could suffer loss of quality when they are exposed, even briefly, to temperatures outside their respective ranges or being stored for longer than their intended shelf lives. Temperature sensitive devices that change color in response to cumulative exposure to time and unfavorable temperatures have been used for monitoring the storage and handling of perishable products. Such indicator systems are used to provide visual signals to when a product has reached a point of unsafe or unappealing quality or the end of its useful and/or specified shelf life, for example due to excessive exposure to temperature above a certain threshold for a given amount of time.

Conversely, certain items, such as meats, may require a given minimum threshold temperature to be reached before the item can be safely, effectively, or reliably used. An indicator system could then show that such a threshold temperature has indeed been reached.

SUMMARY

The present disclosure describes a temperature-responsive photonic crystal device. Such a device may be useful as a threshold temperature exposure indicator. The photonic crystal device displays a certain characteristic reflection peak in its initial state. The exposure of the photonic crystal device to temperatures above a predetermined threshold causes a physical deformation and/or chemical degradation of the internal structure of the photonic crystal over time, resulting in a change in reflected wavelengths and/or a substantial decrease in the intensity of the characteristic reflection peak. The described device may be used, for instance, as a consumer-protection or food safety device to provide indications, such as visual indications, of a product being exposed to undesirable temperatures or excessive storage time and having therefore suffered a loss of quality.

In some aspects, there is provided a temperature-responsive photonic crystal device comprising: a temperature-responsive photonic crystal material having a reflectance spectrum, the photonic crystal material being responsive to a temperature above a predetermined threshold temperature by a change in the reflectance spectrum; whereby exposure of the device to the temperature above the predetermined threshold temperature is indicated by a detectable change in the device.

In some aspects, there is provided a method of detecting a temperature change in an article comprising the steps of: providing the device described above on the article; observing an initial appearance of the device at a temperature below a predetermined threshold temperature; exposing the article and device to a temperature above the threshold temperature; and observing a changed appearance of the device.

BRIEF DESCRIPTION OF DRAWINGS

FIGS. 8 and 9 are tables listing monomers of polymers suitable for use in the temperature-responsive photonic crystal device.

DETAILED DESCRIPTION

Herein is described a temperature-responsive photonic crystal device. This device may be used to indicate whether a surrounding temperature has met or exceeded a given threshold temperature. Such a device may be based on a temperature-responsive photonic crystal material. The device may exhibit certain visual indications, such that when the device is exposed to temperatures above the threshold temperature there is caused a visually detectable change in the appearance of the device. Such a change may be permanent.

In an example embodiment, such a photonic crystal device may include a photonic crystal material containing an ordered array of voids. Due to a modulation in refractive index, such an array of voids would cause diffraction and thus reflection of a particular wavelength range for light impinging on this photonic crystal material. Exposure of this porous photonic crystal material to temperatures above the threshold temperature may cause a disruption (e.g., collapse of lattice layers or decrease in lattice spacing) of the ordered array of voids, which may then cause a decrease in the intensity of reflectance for said particular wavelength range. This disruption may be due to the photonic crystal material having a characteristic melting or softening temperature or temperature range, below which it is rigid and stable. At temperatures above this melting or softening temperature or temperature range, the photonic crystal material may begin to soften and flow, resulting in the softening and sagging deformation of the ordered array of voids, thereby causing the reflection intensity and/or characteristic wavelength range of the reflection to decrease. The deformation of the ordered array of voids may include collapsing of the lattice layers, in which case the reflectance wavelength may be unchanged, but the intensity of reflectance may be decreased. The deformation may alternatively or in addition include a decrease in the spacing between lattice layers, in which can the reflectance wavelength may be shifted in addition to being less intense.

Figure 1:
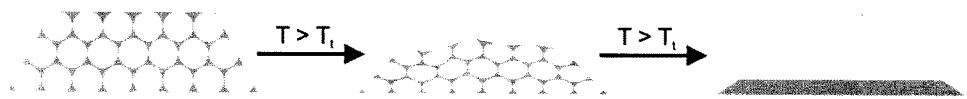
FIG. 1 illustrates a schematic cut-away view of an example temperature-responsive photonic crystal device showing changes in response to temperature.

For example, FIG. 1 shows a schematic cross-section of an example embodiment of the photonic crystal device. Here, the device is exposed to a temperature (T) exceeding the predetermined threshold temperature ($T_t$) of the porous polymer in the photonic crystal material, above which temperature the polymer flows. The deformation of the porous polymer may be homogenous or inhomogeneous. A complete collapse of the voids, for example after being exposed to T over a certain period of time, may result in a material substantially similar to a non-porous polymer. Thus, exposure of the example device to a temperature greater than the threshold temperature $T_t$ causes a change in the structure of the material (e.g., a sagging or decrease in the lattice spacing of the ordered array of voids in at least one direction). As shown in FIG. 1, exposure to a temperature greater than $T_t$ may result in different degrees of such structure change depending on the time of exposure. Exposure to a temperature greater than $T_t$ for a short period of time may result in slight structure change while exposure for a long period of time may result in greater structure change or complete collapse of the photonic crystal structure. The amount of time required for a give amount of structure change may be dependent on how much the exposure temperature is above $T_t$. For example, where the exposure temperature is much greater than $T_t$, the structure change may occur quickly, whereas for an exposure temperature only slightly above $T_t$, the structure change may over very slowly and require a long period of time for such structure change to be visually detectable.

Ultimately, the photonic crystal material may deform to the point where there is complete collapse of the ordered array of voids. In this case, the properties of the photonic crystal may be substantially similar to a non-porous material, such that the device may become substantially colorless and transparent (i.e., there is no more reflectance).

Figure 2:
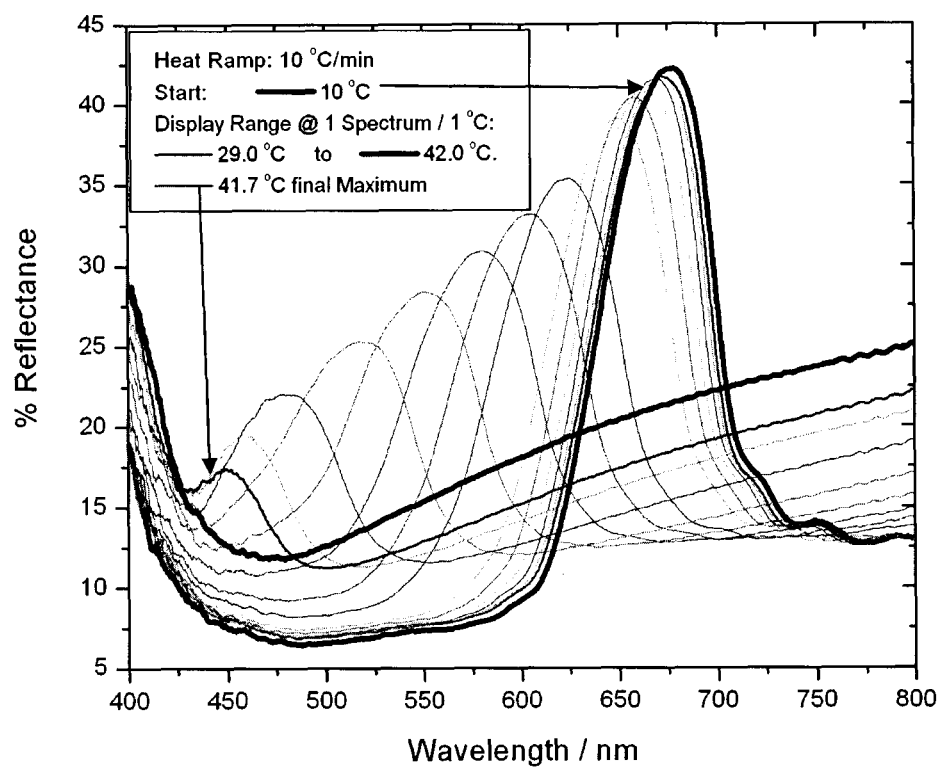
FIG. 2 illustrates reflectance spectra of an example temperature-responsive photonic crystal device at different temperatures.

FIG. 2 illustrates reflectance spectra of an example embodiment of the photonic crystal device at various temperatures. The right-most curve shows the reflectance spectrum at an initial temperature of 10° C., centered around 675 nm. As the temperature to which the device is exposed is increased (in this example, from about 29.0° C. to about 42.0° C.), the reflectivity peak of the reflectance spectra shifts to lower wavelengths (towards the left), while also decreasing in intensity. The end-point of this series of spectra is a device with a collapsed material, where the characteristic reflectance from the photonic crystal structure is no longer present. As shown in FIG. 2, the reflectance spectra of the device exhibits a temperature-dependent rate of change. At a temperature only slightly above the threshold temperature (e.g., at 29.0° C., in this example) the shift in the reflectance spectrum is very slight. At a higher temperature (e.g., at 40.0° C., in this example), this shift occurs faster. Since in this example the temperature is being increased at a rate of 10° C./minute, this temperature-dependent shift rate results in the observed increase in spectra shifting at higher temperatures.

Such a temperature-responsive photonic crystal device may be sensitive to different conditions of temperature. In one embodiment, the device may have a single temperature threshold, such that once the device reaches a specific threshold temperature, this temperature causes disruption to the ordered array over a given period of time. In another embodiment, the device may have two or more threshold temperatures, each having a different effect on this disruption. The device may be designed to be responsive to two or more threshold temperatures by designing the photonic crystal material to have different deformations at different threshold temperatures. For example, the photonic crystal material may comprise different bonds (e.g., different chemical and/or mechanical bonds) that deteriorate at different temperatures. The photonic crystal materials may also include a polymer having phases and/or regions with varying chemical composition, with each one of these phases and/or regions having a different characteristic thermal response. The photonic crystal material may also include additives that are temperature-sensitive. For example, there may be wax nanoparticles embedded in the photonic crystal material that melt at a certain threshold temperature different from the threshold temperature of a polymer material in the photonic crystal material. When the threshold temperature of the wax nanoparticles is exceeded, the wax melts, thus changing the lattice structure and/or refractive index of the photonic crystal material. There may be different types of such wax nanoparticles, with different threshold temperatures, to provide the device with several different threshold temperatures. Other such nanoparticles or additives having different temperature responses may be included in the photonic crystal material.

In general, the rate of occurrence of the disruption of the ordered array may be substantially dependent on external temperature. For example, deformation of the photonic crystal material in the device may be very slow at a temperature only slightly above its threshold temperature, such that the change in its reflectance is very gradual; whereas at a temperature much higher than its threshold temperature, deformation of the photonic crystal material may occur very rapidly, such that the change in its reflectance is relatively quick or almost immediate.

Figure 3:
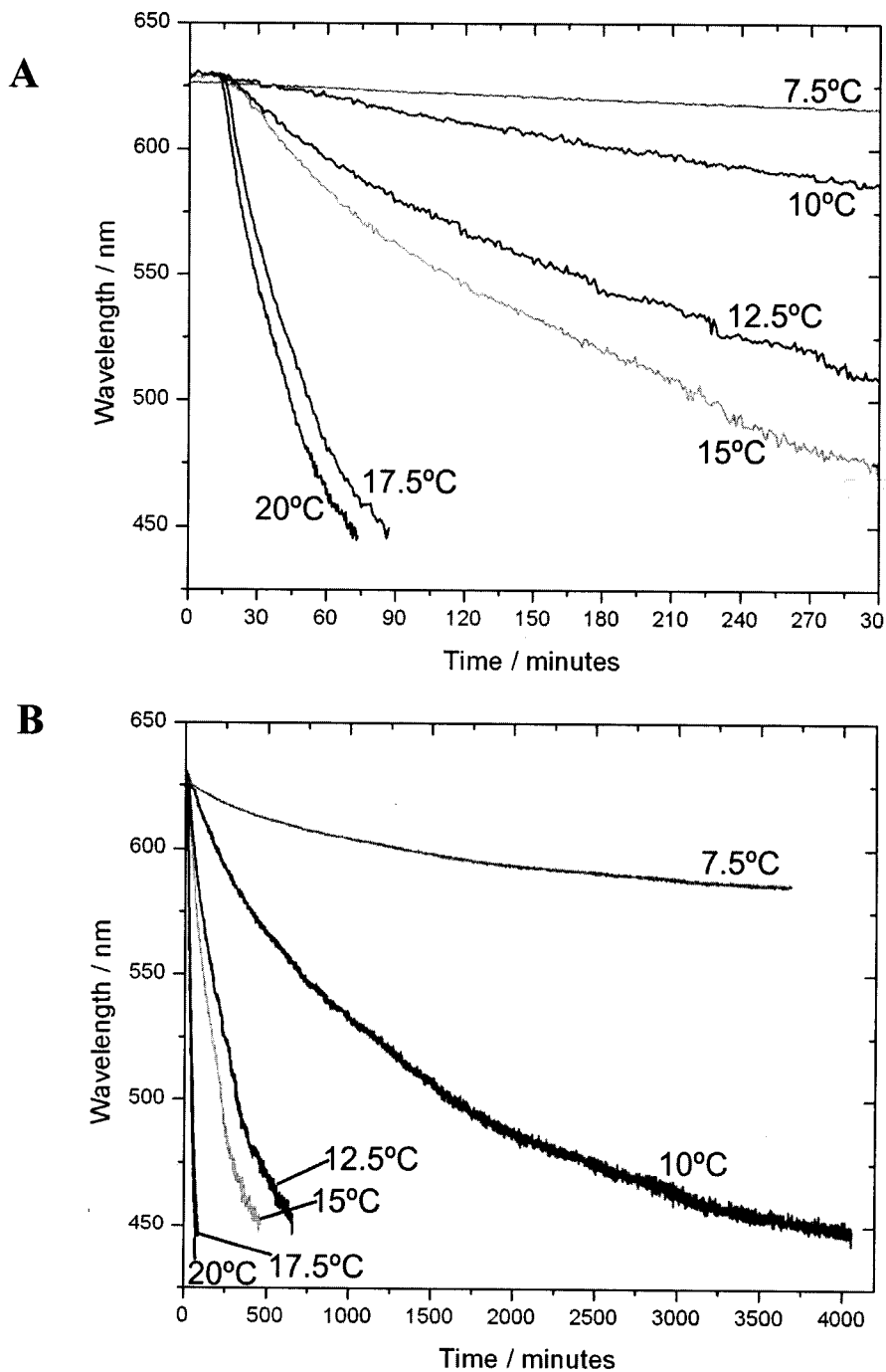
FIGS. 3A and 3B illustrate changes over time in the reflectivity spec of an example temperature-responsive photonic crystal device at different temperatures.

FIGS. 3A and 3B illustrate plots of the change in the reflectivity maximum of an example embodiment of the photonic crystal device over time for a series of different temperatures. FIG. 3A shows a detailed view of FIG. 3B, with FIG. 3A showing plots for the time scale 1 to 300 minutes while FIG. 3B shows plots for the time scale 1 to 4000 minutes. These figures demonstrate that for a device with a given photonic crystal material, the rate of the temperature-derived structural deformation may depend significantly on the exposure temperature, with deformation occurring relatively faster at relatively higher temperatures.

In some example embodiments, the device may be designed for indicating the storage life of an article. For example, for an article having a preferred storage temperature, the temperature-responsive device may be designed to have a threshold temperature very slightly lower than the storage temperature. Thus, when the article is stored at the storage temperature, the photonic crystal material in the device would undergo very slow deformation (e.g., over a period of months or years), such at or near the end of the storage life of the article, the change in the device would indicate that the article has expired or is close to expiring.

The photonic crystal material may comprise an ordered array of voids, and these voids may have an average diameter range of about 50 nm to 5000 nm, in some examples having an average diameter range of about 150 nm to 900 nm. The voids within the ordered array may be spherical, or substantially spherical, and may be interconnected as to form a network structure. A particular embodiment of such a material is referred to as an inverse opal, an example of which is described in PCT Publication No. 2008/098339, the entirety of which is hereby incorporated by reference.

In an example, the described device is based on a photonic crystal having a polymer having an ordered array of substantially spherical voids, forming a porous polymer. The disruption of the ordered array of voids may be caused by a physical deformation of this polymer. The cause of this physical deformation may be due to several phenomena, including but not limited to exceeding the glass transition temperature, exceeding the melting temperature, breaking of chemical bonds, breaking of physical bonds, presence of temperature-responsive additives (e.g., additives having thermal transitions either lower or higher than the base polymer material), or combinations thereof. The base polymer material in the photonic crystal may be selected from the group including but not limited to polyacrylates, polymethacrylates, polyethers, polyesters, polyolefins, polyamides, fluoropolymers, biopolymers, inorganic polymers, phenolic resins, silicones, and copolymers thereof.

FIGS. 8 and 9 are tables listing the monomers of example suitable polymers for use in the photonic crystal material. The glass transition temperatures ($T_g$) and melting point temperatures ($T_m$) are also listed.

The porous polymer in the photonic crystal material may be comprised of linear polymer chains, branched polymer chains, or may be cross-linked to form a cross-linked polymer network. The cross-linking units in the cross-linked polymer network may be selected from the group consisting of but not limited to: covalent bonds, ionic bonds, polar covalent bonds, hydrogen bonds, hydrophobic interactions, coordinations bonds, or combinations thereof.

In some example embodiments, the porous polymer in the photonic crystal material may comprise cross-links. In some example embodiments, cross-linking may provide additional structure stability to the polymer material, may prevent early or unwanted collapse of the structure, and/or may change (e.g., raise) the profile of the polymer's thermal transition. The addition of cross-linking should be carried out carefully, since addition of cross-linkers above a threshold value (i.e., critical cross-linker loading) may cause the polymer to have permanent shape retention—that is, the material may substantially retain its shape over the range of temperatures of interest. Depending on the nature of the polymer material as well as the nature of the cross-linking group (e.g., the length and/or flexibility of the chemical group between cross-linking points), this critical cross-linking loading may occur anywhere from around 0.1% to around 80% cross-linker content by volume, for example around 0.5% to around 5% (e.g., for certain short-chain cross-linkers).

Figure 4:
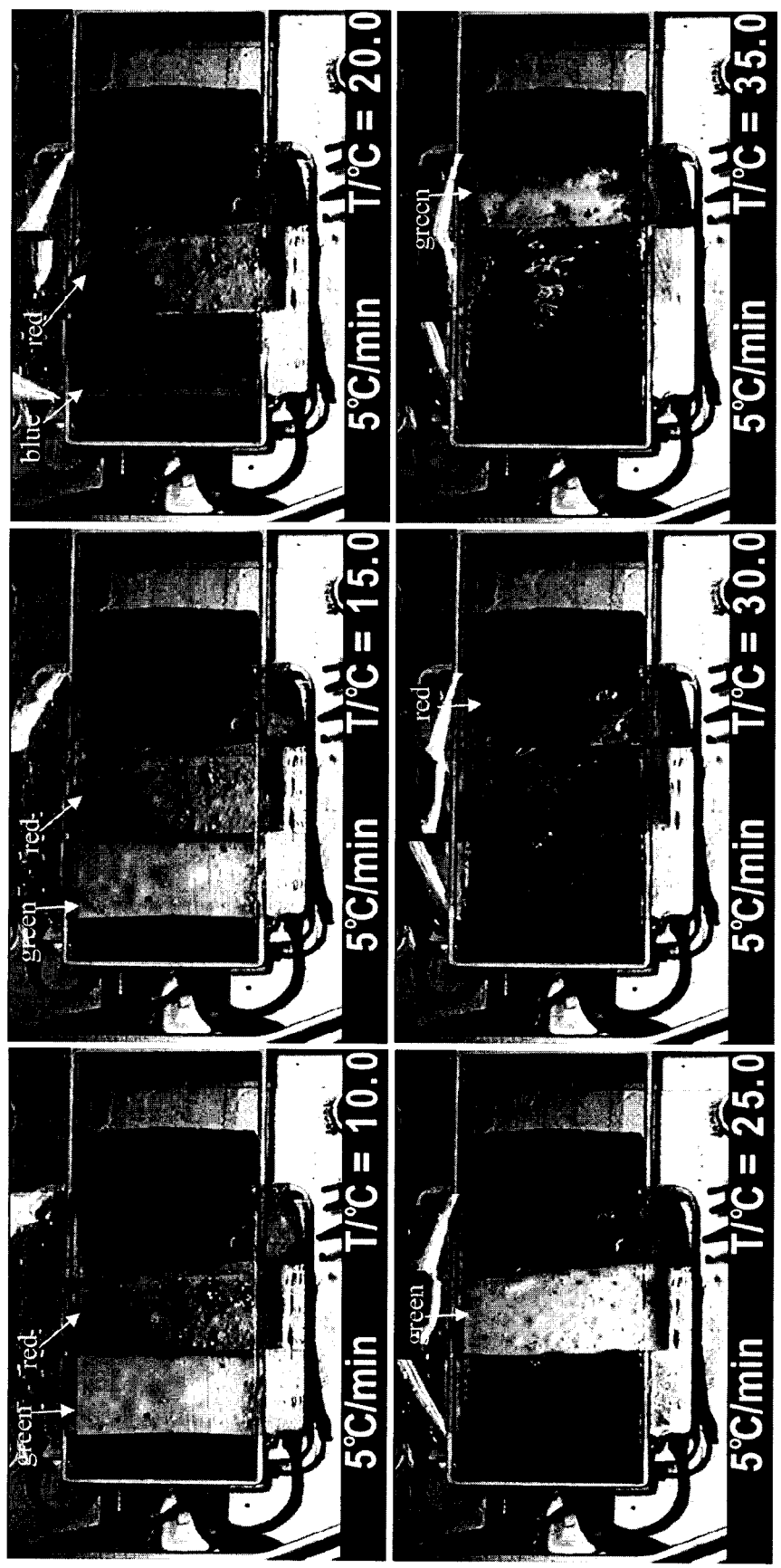
FIG. 4 illustrates changes in appearance over time for different example temperature-responsive photonic crystal devices.

FIG. 4 shows a series of pictures of three different example temperature-responsive photonic crystal devices at different exposure temperatures. The devices are mounted on a temperature-controlled Pelletier stage. The three devices are designed to have different threshold temperatures as well as different structural deformation kinetics. Each device exhibits a different spectrum shift (or color decay) profile, as shown in FIG. 4. Each of the three devices initially exhibit a color (i.e., reflectance spectrum in the visible wavelength range), and when exposed to temperatures above its respective characteristic threshold temperature for a sufficient time period (which may be different for each device), become non-colored (i.e., reflectance spectrum outside of the visible wavelength range or loss of a characteristic reflectance spectrum) and take on characteristics similar to a non-porous polymer.

Figure 5:
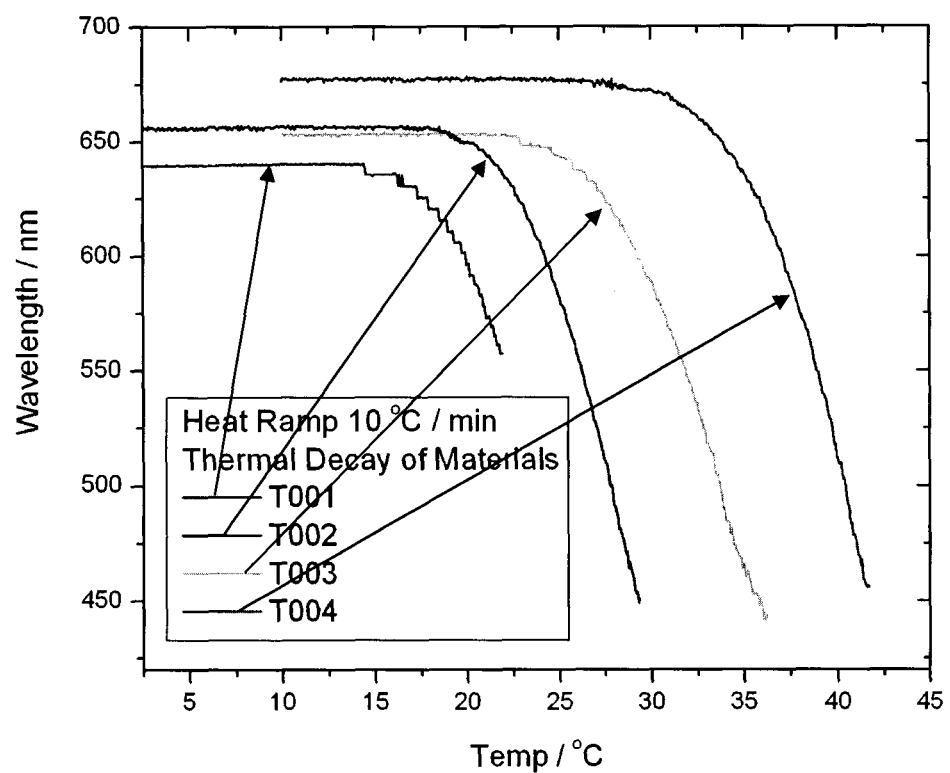
FIG. 5 illustrates a series of decay curves for different example temperature-responsive photonic crystal devices.

FIG. 5 illustrates a series of decay curves for four different example temperature-responsive devices having different threshold temperatures, where the peak reflectivity is plotted with respect to temperature at a constant heating rate.

Figure 6:
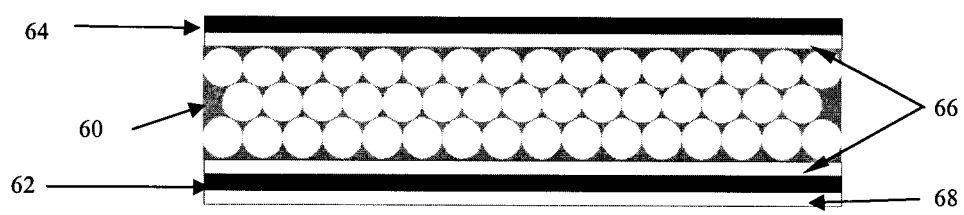
FIG. 6 is a cross-sectional schematic of an example temperature-responsive photonic crystal device.

In FIG. 6, a cross-section design schematic of an embodiment of the described temperature-responsive device is shown. The device includes a temperature-responsive photonic crystal material 60, which may be supported on a flexible or rigid substrate 62. The substrate 62 may be clear, opaque, colored, and may incorporate patterns or data content. Suitable substrate materials may include plastic films, plastic sheets, metal foils, and other suitable materials. The device may optionally include a protective top coating 64, which may include plastic films, lacquers, varnish, latex, or other materials. Adhesives 66 may optionally be included between the substrate 62 and the photonic crystal material 60, and/or between the top protective 64 coating and the photonic crystal material 60, in order to improve bonding characteristics. Additional adhesives 68 may optionally be applied to the back of the substrate 62 for attachment of the device to an article or product.

The temperature-responsive photonic crystal device may provide an indication of exceeding a temperature threshold in a number of ways, examples of which are described here.

In an example embodiment, the device is supported on a transparent substrate. Initially, when the device is viewed using reflected light, the device exhibits a visually detectable color corresponding to the characteristic reflection peak. If the device is viewed using transmitted light, the color will be made up of those wavelengths complimentary to the characteristic reflection peak. As the device is exposed to a temperature above a predetermined threshold temperature, the device exhibits a disappearance or change in the color in the indicator, which may be visually detectable, for example as the intensity of the reflectance is decreased or the reflectance wavelength is shifted due to deformation of the photonic crystal material.

In another example embodiment, the temperature-responsive device could include a colored background, such as a colored substrate material, such that as the device is exposed to a temperature above a threshold temperature, the appearance (e.g., a viewer's visual perception) of the colored background would be changed. For example, as the intensity of the reflectance of the photonic crystal material decreases due to temperature-responsive structural deformation, the background color may be revealed or may be combined with the color of the reflectance wavelength to result in an overall change in appearance.

Figure 7:
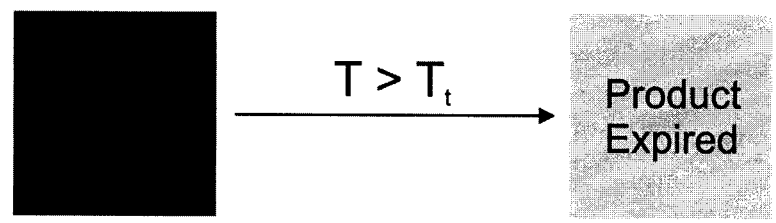
FIG. 7 is a top-view schematic of an example temperature-responsive photonic crystal device having visual information.

In another example embodiment, the temperature-responsive device may include contain a design, such as a pattern, image, data content, geometric patterns, logo, picture or data (e.g., barcode or alphanumeric codes), or other such visual information. For example, such designs may be printed on the substrate. Once such a device is exposed to a temperature above a threshold temperature, the appearance (e.g., a user's visual perception) of the visual information would be changed. For example, deformation of the photonic crystal material at a temperature above a threshold temperature may reveal a background design on the substrate. The FIG. 7 is a top-view illustration of an example embodiment, whereby as the device is exposed to a temperature (T) above a threshold temperature ($T_g$), a red color arising from reflection from the photonic crystal material would fade (i.e., decrease from its initial intensity), thus revealing text printed on the substrate behind it. Although in this example the design is printed on the substrate, the design may also be provided within the substrate, on or within adhesive layers and/or protective coatings, on or within the photonic crystal material, or behind the device (e.g., on the surface of the article to which the device is applied).

In an example embodiment, the temperature-responsive device may include two or more regions with different temperature responses. For example, these two or more regions may initially exhibit the same perceptible or visual appearance, or may have dissimilar appearances. In an example where the two or more regions initially appear similar, when a certain temperature (e.g., threshold temperature of one region) is reached or exceeded, one or these regions may exhibit a change and/or fade in color while the remaining regions may remain unchanged or may change and/or fade at a different rate and/or threshold temperature, such that over time the two or more regions may appear dissimilar from each other. In an example where the two or more regions initially appear dissimilar, when a certain temperature is reached or exceeded, the two or more regions may become more similar in appearance. In some examples, the two or more regions may be patterned such that images, designs, logos, alphanumeric characters, and other types of visual data may be made more or less visible upon exposure to a particular temperature or temperature range.

A temperature-responsive device as described above may indicate to a user or viewer the fact that an article has been exposed to an undesirable temperature range (e.g., where an article should not be exposed to high temperatures, as in refrigerated products). Conversely, such a device may be used to signal to the user that a desirable temperature range has been reached (e.g., where an article should be exposed to high temperatures, as in heat sterilization). The temperature-responsive device may undergo a permanent change in appearance, such that the device would indicate a temperature exceeding a threshold temperature even when an article was brought back down to a temperature below the threshold temperature. This may allow the temperature history of an article to be correctly tracked and indicated.

For example, when an article having the device attached is brought above a predetermined threshold temperature for a short time, the device may exhibit a partway change in appearance (e.g., a change from an intense red color to a paler red color). Even when the article is brought back below the threshold temperature, the appearance of the device does not recover (e.g., the pale red color does not recover back to an intense red color). This may indicate to the user that the article has been exposed to unfavorable temperatures, but the presence of some red color may indicate that the article may still be useable. When the article is again brought above the threshold temperature, the device may complete the change in appearance (e.g., a complete change to transparent). Again, even when the article is brought back below the threshold temperature, the appearance of the device does not recover, thus indicating to the user that the article is no longer useable.

In an example embodiment, the temperature-responsive device may have a latent temperature-sensitivity. For example, the device may be initially protected (e.g., by a structural support preventing structural deformation or by a temperature buffer) such that it displays an insensitivity or a much-reduced sensitivity to temperature. By removing the protection from the device, the device then exhibits a greater temperature sensitivity. In an example embodiment, such protection may be offered by filling the voids of the porous polymer photonic crystal material in the device with a liquid such as water, and the liquid may be sealed into the photonic crystal structure by providing a hermetic cover-sheet or covering over the photonic crystal material. The liquid may provide structure to the material, preventing or inhibiting sagging or deformation in response to thermal stimuli. In some examples, the liquid may also act as a thermal buffer. When the cover-sheet or covering is removed (e.g., by manually peeling off), the liquid in the voids is able to evaporate, thus removing the structural support and/or thermal buffer and resulting in the device being temperature-responsive.

In another example embodiment, the temperature-responsive device may include a supportive component or additive that is sensitive to ambient conditions. For example, such a supportive component or additive may be relatively rigid and may prevent the device from structurally deforming due to thermal stimuli. This supportive component or additive may be removed, for example by degradation upon contact with, for example, oxygen (e.g., in air), biological species (e.g., bacteria in air), ambient light and/or moisture (e.g., in air). The photonic crystal device in this example may initially be sealed by a hermetic and/or opaque cover-sheet or covering, protecting the supporting component or additive from degradation. In this initial state, the photonic crystal material in the device is structurally supported and thus the device exhibits none or little sensitivity to temperature. When the cover-sheet or covering is removed (e.g., by manual peeling), the supportive component or additive is exposed to atmospheric conditions and is degraded to some extent, causing the device to become increasingly sensitive to temperature.

Such latent temperature-sensitivity may be useful, for example, in preserving the function of the device in a variety of temperature environments (e.g., during manufacture, before being applied to an article of interest) and allow its temperature-responsiveness to be activated at a desired time (e.g., after it is applied to an article of interest or at a desired timed).

The temperature-responsive device may be useful in a number of applications. For example, the temperature-responsive device may be applied to the packaging of products before storage and distribution. It may be used, for instance, as consumer protection device in products selected from but not limited to foodstuffs, over-the-counter and prescription drugs, medicines and pharmaceuticals, vaccines, vitamins, nutritional supplements, herbal formulations, herbicides, pesticides, cosmetics, perfumes, photographic materials, batteries, biological materials, live tissue samples, chemical substances, wine, spirits, beer, cigarettes, cigars, and combinations thereof.

The fabrication of the temperature-responsive device may be carried out in a manner substantially similar to that shown in PCT Patent Application No. 2008/098339.

EXAMPLES

An example of the manufacture of an example temperature-responsive photonic crystal device is now described. In this example, a dispersion of substantially monodisperse silica microspheres ranging from about 150 to about 500 nm are prepared using the Stober method (W. Stober, A. Fink, E. Bohn, J. Colloid Interface Sci. 26, 62 (1968)). This dispersion is coated onto a letter-sized, 2 MIL Mylar sheet using a draw-down coating bar (R.D. Specialties). Following drying for 1 minute, the coating is infiltrated with a thin coating of reactive monomer mixture using a fixed-gap applicator (Elcometer), comprising 20-99.9% mono-methacrylate, 0-80% di-, tri-, or tetra-functional methacrylate, and 0.1 to 5% of UV radical initiator, by volume. In an example embodiment, the monoacrylate may be methyl methacrylate, the di-functional acrylate may be ethylene glycol dimethacrylate, and the UV radical initiator may be phenyl-cyclohexyl-methyl ketone. Following infiltration, the coating is cured on a UV conveyor system (Fusion UV, 300 watts/inch) at line-speeds of between 2 and 50 feet/minute. Following UV curing, the coating is etched in diluted aqueous hydrofluoric acid (2% aqueous solution) for 2 minutes, washed with distilled water, and dried with a nitrogen stream to generate the temperature-response photonic crystal material with a thermal melting transition in the range of about 85° C. to about 105° C.

Another example of the manufacture of an example temperature-responsive photonic crystal device is now described. A coating of silica microspheres made as in the example above is infiltrated with a mixture of two different mono-methacrylates, whose corresponding polymers have different thermal transition temperatures. The mixture of the two mono-methacrylates comprises 20-99.9% of the mixture, with 0 to 80% of di-, tri-, or tetra-functional methacrylate, and 0.1 to 5% of UV radical initiator, by volume. An example embodiment may comprise a mixture of methyl methacrylate and 2-ethyl hexyl methacrylate as mono-methacrylates. Following processing as in the example described above, a temperature-responsive photonic crystal material is obtained. At 100% relative loading of methyl methacrylate in the mono-methacrylate mixture, the material has a thermal transition temperature in the range of about 85° C. to about 105° C.; whereas at 100% relative loading of 2-ethyl hexyl methacrylate in the mono-methacrylate mixture, the material has a thermal transition temperature in the range of about −10° C. to about 5° C. Mixtures of the two mono-methacrylates give thermal transition temperatures intermediate to these two ranges.

Other manufacturing methods may also be suitable. Variations to the manufacture methods may be made to obtain certain desired temperature-responsive profiles. Other materials and/or additives may be used.

The embodiments and examples of the present disclosure described above are intended to be examples only. Alterations, modifications and variations to the disclosure may be made without departing from the intended scope of the present disclosure. In particular, selected features from one or more of the above-described embodiments and examples may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A temperature-responsive photonic crystal device comprising:
   a temperature-responsive photonic crystal material having a reflectance spectrum for light incident to an incident surface and comprising an ordered array of voids, wherein the ordered array of voids consists of an array of spherical or substantially spherical voids arranged in a close-packed crystal structure, wherein exposure of at least a portion of the photonic crystal material to temperatures above a predetermined threshold temperature results in a disruption of at least one portion of the ordered array of voids, wherein the disruption of the ordered array results in a decrease in lattice spacing of the ordered array in the at least one portion, the disruption causing a change in the reflectance spectrum;
   whereby exposure of the device to the temperature above the predetermined threshold temperature is indicated by an irreversible detectable change in the device.

2. The device of claim 1 wherein the detectable change is a change in a visual appearance of the device.

3. The device of claim 1 wherein the disruption of the ordered array results in collapse of the voids in the at least one portion.

4. The device of claim 1 wherein exposure of the device to the temperature above the threshold temperature causes the disruption over a period of time.

5. The device of claim 4 wherein the disruption occurs at a rate dependent on the temperature to which the device is exposed.

6. The device of claim 1 wherein the photonic crystal material having an ordered array of voids is a porous polymer.

7. The device of claim 6 wherein the disruption of the ordered array is caused by structural deformation of the porous polymer.

8. The device of claim 7 wherein the cause of the structural deformation is due to an effect based on a material property selected from the group consisting of: a glass transition temperature, a melting temperature, breaking of chemical bonds, breaking of physical bonds, temperature responsive additives, and combinations thereof.

9. The device of claim 8 wherein the polymer is selected from the group consisting of: polyacrylates, polymethacrylates, polyethers, polyesters, polyolefins, polyamides, fluoropolymers, biopolymers, inorganic polymers, phenolic resins, silicones, copolymers thereof, and combinations thereof.

10. The device of claim 1 wherein the change in the reflectance spectrum includes at least one of: a decrease of reflectance intensity and a shift in a reflectivity peak.

11. The device of claim 1 wherein there is more than one predetermined threshold temperature.

12. The device of claim 1 wherein the photonic crystal material includes a removable protective additive that prevents the device from being responsive to the temperature above the threshold temperature, and wherein the device is responsive to the temperature above the threshold temperature when the protective additive is removed.

13. The device of claim 12 wherein the protective additive is a liquid providing structural support to the photonic crystal material, wherein the device includes a covering over the photonic crystal material for conserving the liquid and removal of the covering results in removal of the liquid.

14. The device of claim 12 wherein the protective additive degrades in atmospheric conditions, wherein the device includes a covering over the photonic crystal material for conserving the protective additive and removal of the covering results in degradation and removal of the protective additive.

15. The device of claim 1 comprising at least one of: an underlying background color, image and data content; wherein an appearance of at least one of background color, image and data content is changed once the device had been exposed to the temperature above the threshold temperature.

16. The device of claim 1 wherein the device is adapted for use in any one of: foodstuffs, over-the-counter and prescription drugs, medicines and pharmaceuticals, vaccines, vitamins, nutritional supplements, herbal formulations, herbicides, pesticides, cosmetics, perfumes, photographic materials, batteries, biological materials, live tissue samples, chemical substances, wine, spirits, beer, cigarettes, cigars, and combinations thereof.

17. The device of claim 1 wherein the device exhibits different changes in at least two regions, in response to the temperature above the threshold temperature.

18. A method of detecting a temperature change in an article comprising the steps of:
   providing the device of claim 1 on the article;
   observing an initial appearance of the device at a temperature below a predetermined threshold temperature;
   exposing the article and device to a temperature above the threshold temperature; and
   observing a changed appearance of the device.

19. The device of claim 1, wherein the ordered array of voids causes a modulation in refractive index of the photonic crystal device and wherein the modulation of refractive index results in the reflectance spectrum.

20. The device of claim 1, wherein the voids have an average diameter range of about 50 nm to 5000 nm.

21. The device of claim 1, having one or more lattice constants defined by the crystal structure.

22. The device of claim 1, having spheres of one or more sizes.

23. The device of claim 1, wherein the ordered array of voids is arranged in a face-centered cubic crystal structure.

24. The device of claim 1, wherein the ordered array of voids is arranged in a hexagonal close-packed structure.

25. The device of claim 1, wherein the ordered array of voids is arranged in a mixed face-centered cubic and hexagonal close-packed structure.

26. The device of claim 1, wherein the ordered array of voids is arranged in a random close-packed structure.

27. The devices of claim 1, wherein the ordered array of voids is arranged in an inverse opal structure.

* * * * *